United States Patent [19]

Wuest et al.

[11] Patent Number: 5,028,654
[45] Date of Patent: Jul. 2, 1991

[54] COMPOSITION AND PROCESS FOR BONDING RUBBER TO METAL

[75] Inventors: Willi Wuest, Ratingen; Wolf-Dieter Beiersdorf, Duesseldorf, both of Fed. Rep. of Germany

[73] Assignee: Henkel Kommanditgesellschaft auf Aktien, Duesseldorf, Fed. Rep. of Germany

[21] Appl. No.: 335,026

[22] Filed: Apr. 6, 1989

[30] Foreign Application Priority Data

Apr. 8, 1988 [DE] Fed. Rep. of Germany ....... 3811803

[51] Int. Cl.$^5$ .................................................. C08K 5/03
[52] U.S. Cl. ..................................... 524/469; 524/259; 524/519; 524/552
[58] Field of Search ............... 524/259, 469, 575, 464, 524/519, 552, 525, 526, 527, 572

[56] References Cited

U.S. PATENT DOCUMENTS

| | | | |
|---|---|---|---|
| 2,725,373 | 11/1955 | Reynolds | 260/92.3 |
| 2,900,292 | 8/1959 | Coleman et al. | 154/130 |
| 4,119,587 | 10/1978 | Jazenski et al. | 524/259 |
| 4,308,071 | 12/1981 | Gervase | 528/10 |
| 4,483,962 | 11/1984 | Sadowski | 524/552 |
| 4,675,355 | 6/1987 | Hirata et al. | 524/575 |
| 4,684,421 | 8/1987 | Tate | 524/575 |
| 4,795,778 | 1/1989 | Bond et al. | 524/364 |

FOREIGN PATENT DOCUMENTS 2155488  9/1985  United Kingdom ............... 524/552

OTHER PUBLICATIONS

*Polyvinyl chloride,* Harold A. Sarvetnick, Van Nostrand Reinhold Co., New York, 1969, pp. 88–89.
*Rubber to Metal Bonding,* S. Buchan, Crosby Lockwood & Son Ltd., London 1959.

Primary Examiner—Joseph L. Schofer
Assistant Examiner—R. H. Delmendo
Attorney, Agent, or Firm—Ernest G. Szoke; Wayne C. Jaeschke; Norvell E. Wisdom, Jr.

[57] ABSTRACT

The invention seeks to improve the preheating resistance and high temperature resistance during vulcanization of a cement for the vulcanization of rubber onto metals. Such cements conventionally contain metal-binding polymers, dinitrosobenzene, organic solvents and, optionally, other components, such as acid-binding agents and reinforcing fillers. The goals of the invention are achieved by partial replacement of the usual metal-binding polymers by substituted aromatic compounds bearing two or more substituent groups having the formula —$CH_2Br$.

10 Claims, No Drawings

5,028,654

COMPOSITION AND PROCESS FOR BONDING RUBBER TO METAL

FIELD OF THE INVENTION

This invention relates to vulcanization bonding of rubber compositions to metals with the aid of a particular type of vulcanizable composition.

STATEMENT OF RELATED ART

Rubber-to-metal bonded products are of considerable importance in many branches of industry. Such bonds are normally achieved with the aid of special vulcanizable compositions of rubber and other ingredients that serve as cements to bond metal to bulk rubber. To obtain the best adhesion, the rubber mixtures have to be vulcanized onto the metal at elevated temperature.

A known rubber-to-metal cement is described in U.S. Pat. No. 2,900,292 of Aug. 18, 1959 to Coleman et al. This known cement contains a metal-binding polymer compound, including inter alia brominated poly-2,3-dichloro-1,3-butadiene (brominated PDCB), optionally other metal-binding polymers and the auxiliaries typical of such mixtures.

An object of the present invention is to improve the preheating resistance and the high temperature resistance of cements for the vulcanization of rubber onto metals. In this context, preheating resistance means that when multiple-size molds or presses are loaded with parts which contain the cement on their surface, there should be no premature reaction on the parts introduced first into the multiple-size mold. In the present application, high temperature resistance is to be understood to mean that vulcanization can be carried out successfully at relatively high temperatures. The term does not imply anything about the retention of bond strength of the composites when subjected to further heating after bonding is complete.

DESCRIPTION OF THE INVENTION

Except in the operating examples, or where otherwise expressly stated to the contrary, all numbers in this description representing amounts of materials and reaction or use conditions are to be understood as modified by the term "about".

One embodiment of the present invention is a cement for the vulcanization of rubber onto metals. The cement contains at least metal-binding polymers; molecules containing from one to three aromatic nuclei, including fused aromatic nuclei, and from two to six nitroso groups attached directly to non-adjacent nuclear carbon atoms; and organic solvents. If desired, the cement composition may contain other components, such as acid-binding agents and reinforcing fillers. The compositions of the invention are distinguished from those of the prior art primarily by containing, as a replacement for part of the metal-binding polymer component, substituted aromatic compounds containing two or more —$CH_2Br$ substituent groups.

The cements according to the invention preferably have a composition within the following ranges:

0.2 to 2.5% by weight of aromatic compounds containing two or more groups —$CH_2Br$;
5 to 25 % by weight of other metal-binding polymers;
0.2 to 5 % by weight of molecules containing from one to three aromatic nuclei, including fused aromatic nuclei, and from two to six nitroso groups attached directly to non-adjacent nuclear carbon atoms;
0.2 to 10 % by weight of acid-binding agents;
0.1 to 10 % by weight of reinforcing fillers; and
70 to 90 % by weight of organic solvents.

Accordingly, an important constituent of the cements is the metal-binding component. It consists predominantly of halogenated polymer. A preferred polymer is brominated PDCB, but PDCB itself is suitable as the polymer. Among the theoretically possible and known bromination products of PDCB, there is a preference for those products that can be obtained by radical bromination under conditions where the bromine atoms are incorporated in the allyl position with respect to the double bonds present. One process for the production of products such as these is described in U.S. Pat. No. 2,725,373 of Nov. 29, 1955 to Reynolds. The degree of bromination preferably is between 5 and 32% by weight, corresponding to 7.5 to 42 mole %. The starting material preferably used for the bromination is a PDCB produced by radical polymerization; advantages can be afforded by products which have been polymerized at relatively low temperatures. Suitable PDCB for brominating need not be film-forming at room temperature, although the bromination products are film-forming polymers.

In many cases, it may be preferable to use brominated PDCB in admixture with other polymers, particularly halogenated polymers, in the metal-binding polymer component of compositions according to the invention. Thus, brominated PDCB may be used together with chlorinated EPDM or with chlorosulfonated polyethylene, providing the stability of the mixture in storage is adequate. A mixture of brominated PDCB and chlorinated rubber is particularly preferred.

Many other polymers which are mentioned in U.S. Pat. No. 2,900,292 cited above may also be used as further metal-binding polymers. Thus, it is possible to use thermally crosslinking polyesters, thermally crosslinking triazine resins, and polymers and copolymers of polar, ethylenically unsaturated compounds. Suitable polymers and copolymers of polar, ethylenically unsaturated compounds include, for example, polyvinyl butyral, polyvinyl formal, polyvinyl acetate, chlorinated polyvinyl chloride, and the like; copolymers of vinyl acetate and vinyl chloride, chlorinated copolymers of vinyl acetate and vinyl chloride. Polymers of acrylic acid, copolymers of acrylic acid and conjugated dienes, such as 1,3-butadiene, 2-chloro-1,3-butadiene, 2,3-dichloro-1,3-butadiene, may also be used, as may post-halogenated products of these starting polymers. Other chlorinated rubbers are also suitable, including for example chlorinated synthetic rubbers, such as chlorinated polybutadiene, chlorinated copolymers of butadiene and styrene and mixtures of chlorinated rubbers or hypohalogenated rubbers and the like. Numerous polyisocyanates and adducts thereof with epoxy resins may also be used.

Mixtures of brominated PDCB with halogenated rubbers, particularly chlorinated rubber, are preferred as the metal-binding polymers. The brominated PDCB preferably makes up from 15 to 35% by weight of the total quantity of metal-binding polymer component, exclusive of the content of substituted aromatic compounds with at least two —$CH_2Br$ substituent groups.

The cements according to the invention for the vulcanization of rubber onto metals contain an aromatic compound including two or more than two substituent groups having the formula —CH₂Br as their characteristic component. This compound is preferably used together with the brominated PDCB. It has been found in this connection that 5 to 25% by weight of the quantity of brominated PDCB used in the prior art may advantageously be replaced by these aromatic compounds. Suitable aromatic compounds containing two or more groups having the formula —CH₂Br are, for example, the various isomeric xylenes which are brominated in both of their side chains.

It has been found in practice that a product, which can be obtained in the radical photobromination of "technical xylene" to a mixture containing two bromine atoms in each xylene molecule, is particularly suitable for the invention. Technical xylene as meant in this connection generally contains 19% ortho-xylene, 44% meta-xylene, 18% para-xylene, and 18% ethyl benzene. Products containing the required —CH₂Br groups are formed in the photobromination reaction, which is preferably carried out under irradiation with visible light at temperatures of from 70 to 80° C. in a solvent, such as carbon tetrachloride. It has been found that nucleus-brominated xylenes and partially nucleus-brominated xylenes are not suitable as substitutes for xylenes brominated in the side chain for the purposes of this invention.

The rubber-to-metal cements according to the invention preferably contain dinitrosobenzene as a further constituent. This component acts as a crosslinking agent. It may be replaced in known manner by other compounds as described in more detail between column 5 line 58 and column 6 line 42 of U.S. Pat. No. 4,483,962, which is hereby incorporated herein by reference. For convenience and brevity, any component of the adhesive with molecules selected from the group containing from one to three aromatic nuclei, including fused aromatic nuclei, and from two to six nitroso groups attached directly to non-adjacent nuclear carbon atoms, as further described in the above incorporated teaching of U.S. Pat. No. 4,483,962, may be denoted hereinafter as "dinitrosobenzene or an equivalent thereof".

The rubber-to-metal cements according to the invention may contain other constituents typical of such mixtures. For example, acid-binding agents may be used. One known acid binding agent is basic lead phosphite.

The rubber-to-metal cements according to the invention may also contain fillers which perform a coloring, extending and reinforcing function. Carbon black is a particularly suitable filler.

One skilled in the art will regulate the viscosity of the rubber-to-metal cements according to the invention in such a way that they are easy to process. To this end, it is preferred to dissolve the other components in organic solvents. Suitable organic solvents are those without active hydrogens, often called "aprotic" solvents, particularly highly chlorinated hydrocarbons and/or aromatic hydrocarbons. Thus, perchloroethylene or trichloroethylene, xylene, and toluene may be used as solvents either individually or in mixtures.

The practice of this invention may be further appreciated from the following operating examples.

Examples

Mixtures of rubber stocks to be bonded (in parts by weight)

1. Natural rubber ("NR" in Table 2)

-continued

| | |
|---|---|
| 100 | natural rubber |
| 10 | zinc oxide |
| 2 | stearic acid |
| 1 | phenyl-β-naphthylamine |
| 2 | pine tar |
| 25 | carbon black HAF N 356 |
| 0.33 | zinc dimethyl dithiocarbamate |
| 0.58 | mercaptobenzothiazole disulfide |
| 2.75 | sulfur |

2. Styrene-butadiene rubber ("SBR" in Table 2)

| | |
|---|---|
| 100 | SBR rubber |
| 5 | zinc oxide |
| 1 | stearic acid |
| 50 | carbon black (Corax A) |
| 1 | N-cyclohexyl-2-benzothiazyl sulfenamide |
| 1.5 | sulfur |

3. Chlorobutadiene rubber ("CR" in Table 2)

| | |
|---|---|
| 100 | CR rubber |
| 2 | stearic acid |
| 1.5 | phenyl-β-naphthylamine |
| 100 | Thermalruβ N 990 |
| 70 | coated chalk |
| 20 | red lead |
| 1.5 | antiozonant wax |
| 20 | naphthenic plasticizer |
| 1 | tetramethyl thiuram monosulfide |

4. Acrylonitrile-butadiene rubber ("NBR" in Table 2)

| | |
|---|---|
| 100 | NBR rubber |
| 5 | zinc oxide |
| 1 | stearic acid |
| 80 | furnace black |
| 15 | dioctyl phthalate |
| 1 | tetramethyl thiuram monosulfide |
| 0.2 | diphenyl guanidine |
| 1.5 | sulfur |

Cement compositions according to the invention

The compositions of the cements used are shown in Table 1.

Production of test specimens by a process according to the invention

Samples of cold-rolled steel were degreased with 1,1,1-trichloroethane vapor, blasted with chilled-iron shot and retreated with 1,1,1-trichloroethane vapor.

The steel samples were then coated with approximately 10μ (dry layer thickness) of a conventional primer based on phenolic resin and this was topped by approximately 20μ of the described cements according to the invention.

After drying, the steel samples were bonded to the rubber mixtures in a press at a pressure of about 50 MPa under the vulcanization conditions specified below to form a peel-strength test specimen corresponding to ASTM D 429 B.

After the test specimens had been stored at room temperature for 24 hours, the rubber coating was peeled off, and the tear pattern was determined. The tear pattern is reported as follows in Table 2: the first figure for each entry, followed by "R", expresses the percentage of the total area of failure that showed elastomer on both sides of the tear surface. This type of failure in the test is the most desirable, as it indicates that the bond between the elastomer and the metal is so strong that the cohesion of the elastomer is the weakest factor in the composite. Failure at the interface between elastomer and cement is noted by "/RC" (for rubber-cement) following the R in Table 2. The percentage area for this type of failure equals (100—the number before the R).

To determine preheating resistance, the steel samples coated with primer and cement were left in the hot vulcanization press for various periods specified in Table 2. The elastomer was then vulcanized as described in the first part of the Table.

To determine high temperature cementability, the coated steel specimens were placed in the hot press and immediately vulcanized together with elastomer as described in Table 2.

TABLE 1

Compositions of Some Cements According to the Invention

| Component | Codes for Compositions in Table 2: | | | |
|---|---|---|---|---|
| | CM 0 | CM 1 | CM 2 | CM 3 |
| | Percentages by Weight in Composition | | | |
| Chlorinated rubber | 14.5 | 14.5 | 14.5 | 14.5 |
| Post-brominated PDCB*, (30-35% suspension in xylene) | 6.2 | 5.6 | 5.0 | 4.7 |
| Brominated technical xylene | — | 0.6 | 1.2 | 1.5 |
| Dinitrosobenzene*, (30-35% suspension in xylene) | 2.1 | 2.1 | 2.1 | 2.1 |
| Dibasic lead phosphite | 1.1 | 1.1 | 1.1 | 1.1 |
| Furnace black N 762 | 2.1 | 2.1 | 2.1 | 2.1 |
| Perchloroethylene | 12.0 | 12.0 | 12.0 | 12.0 |
| Technical xylene | 62.0 | 62.0 | 62.0 | 62.0 |

*The percentages in the Table are for this active ingredient only.
CM 0 is a comparative example; CM 1, CM 2, CM 3 are example compositions according to the invention.

TABLE 2

Tear Patterns for Composites Bonded According to the Invention and According to Prior Art

| Elas-tomer | Cement Type | | | |
|---|---|---|---|---|
| | CM 0 | CM 1 | CM 2 | CM 3 |
| Part I: Patterns after Direct Vulcanization for 5 minutes at 190° C. | | | | |
| SBR | 4OR/RC | 100R | 100R | 100R |
| NBR | 60R/RC | 100R | 100R | 100R |
| CR | 80R/RC | 100R | 100R | 100R |
| Part II: Patterns after Preheating for Numbers of Minutes ("""') Shown at 135° C., Then Vulcanizing as in Part I | | | | |
| NR 10' | 100R | 100R | 100R | 100R |
| 12' | 60R/RC | 100R | 90R/RC | 70R/RC |
| 14' | 10R/RC | 80R/RC | 60R/RC | 40R/RC |
| Part III: Patterns after Exposing Samples Vulcanized as in Part I to Water at 95° C. for 2 Hours Under a Load of 0.79 kg/cm | | | | |
| SBR | 100R | 100R | 100R | 100R |

What is claimed is:

1. A composition of cement for use in vulcanization of rubber onto metals comprising:

(1) Xylenes brominated with one bromine atom in each of their side chains;
(B) Metal-binding polymer;
(C) Molecules selected from the group consisting of fused or unfused aromatics containing from one to three aromatic nuclei and from two to six nitroso groups attached directly to non-adjacent nuclear carbon atoms; and
(D) aprotic organic solvent.

2. A cement as claimed in claim 1, comprising:

(A) about 0.2 to about 2.5% by weight of xylenes brominated with one bromine atom in each of their side chains;
(B) about 5 to about 25% by weight of metal-binding polymer;
(C) about 0.2 to about 5% by weight of dinitrosobenzene or a vulcanizing effective equivalent thereof;
(D) about 0.2 to about 10% by weight of acid-binding agent;
(E) about 0.1 to about 10% by weight of reinforcing filler; and
(F) about 70 to about 90% by weight of aprotic organic solvent.

3. A cement as claimed in claim 2, wherein brominated poly(2,3-dichloro-1,2-butadiene) is included in the metal-binding polymer.

4. A cement as claimed in claim 3, wherein the metal-binding polymer consists essentially of a mixture of brominated poly-2,3-dichloro-1,3-butadiene (brominated PDCB) with chlorinated EPDM, chlorosulfonated polyethylene, or chlorinated rubber.

5. A cement as claimed in claim 4, wherein brominated PDCB constitutes from about 15 to about 35% by weight of the total quantity of metal-binding polymers.

6. A cement as claimed in claim 5, wherein the xylenes brominated with a single bromine atom in each side chain are present in a quantity of from about 5 to about 25% by weight of the amount of brominated PDCB.

7. A cement as claimed in claim 1, wherein the brominated xylene molecules used are made by a radical bromination of technical xylene.

8. A cement as claimed in claim 1, further comprising a basic metal salt as an acid-binding agent.

9. A cement as claimed in claim 1, further comprising carbon black as a filler.

10. A cement as claimed in claim 6, wherein carbon black is used as a filler.

* * * * *